United States Patent [19]

Yajima et al.

[11] Patent Number: 4,556,526
[45] Date of Patent: Dec. 3, 1985

[54] PROCESS FOR PRODUCTION OF SINTERED CERAMIC BODY

[75] Inventors: Seishi Yajima; Kiyohito Okamura; Yoshio Hasegawa; Takemi Yamamura, all of Oharai, Japan

[73] Assignee: UBE Industries, Ltd., Yamaguchi, Japan

[21] Appl. No.: 245,849

[22] Filed: Mar. 20, 1981

[30] Foreign Application Priority Data

Mar. 25, 1980 [JP]  Japan ................. 55-36892
Mar. 25, 1980 [JP]  Japan ................. 55-36893
Dec. 25, 1980 [JP]  Japan ................. 55-182816

[51] Int. Cl.$^4$ ............................................. C04B 35/52
[52] U.S. Cl. ........................................ 264/60; 264/62; 264/65; 264/66; 501/91
[58] Field of Search .................. 264/63, 56, 66, 65, 264/60, 62; 501/90, 91

[56] References Cited

U.S. PATENT DOCUMENTS

| | | | |
|---|---|---|---|
| 3,485,904 | 12/1969 | Ostrowski | 264/56 |
| 3,631,139 | 12/1971 | Bauer et al. | 264/56 |
| 3,907,954 | 9/1975 | Mansmann et al. | 264/56 |
| 4,127,411 | 11/1978 | Yajima et al. | 501/87 |
| 4,158,687 | 6/1979 | Yajima et al. | 264/63 |
| 4,289,720 | 9/1981 | Yajima et al. | 264/63 |
| 4,387,080 | 6/1983 | Hatta et al. | 501/90 |

OTHER PUBLICATIONS

Japanese Patent Pub. 94314/78–English Abstract.
Japanese Patent Pub. 3815/79–English Abstract.
Japanese Patent Pub. 16521/79–English Abstract.

Primary Examiner—James Derrington
Attorney, Agent, or Firm—Ladas & Parry

[57] ABSTRACT

A process for producing a sintered ceramic body, which comprises heating a semi-inorganic block copolymer at a temperature of from 500° to 2300° C. in an environment of vacuum or inert gases, reducing gases or hydrocarbon gases, said copolymer comprising polycarbosilane blocks having a main-chain skeleton composed mainly of carbosilane units of the formula $(Si-CH_2)$ and zirconoxane units of the formula $(Zr-O)$; and shaping the heated product, and simultaneously with, or after, the shaping of the heated product, sintering the shaped product at a temperature of from 800° C. to 2300° C. in an environment of vacuum or inert gases, reducing gases or hydrocarbon gases; and a sintered ceramic body consisting substantially of Si, Zr and C and optionally of O, said sintered body being composed substantially of (1) an amorphous material consisting substantially of Si, Zr and C and optionally of O, or
(2) an aggregate consisting subtantially of ultrafine crystalline particles of $\beta$-SiC, ZrC, a solid solution of $\beta$-SiC and ZrC and $ZrC_{1-x}$ wherein $0<x<1$ and having a particle diameter of not more than 500 Å, or
(3) a mixture of said amorphous material (1) and said aggregate (2) of ultrafine crystalline particles.

9 Claims, 1 Drawing Figure

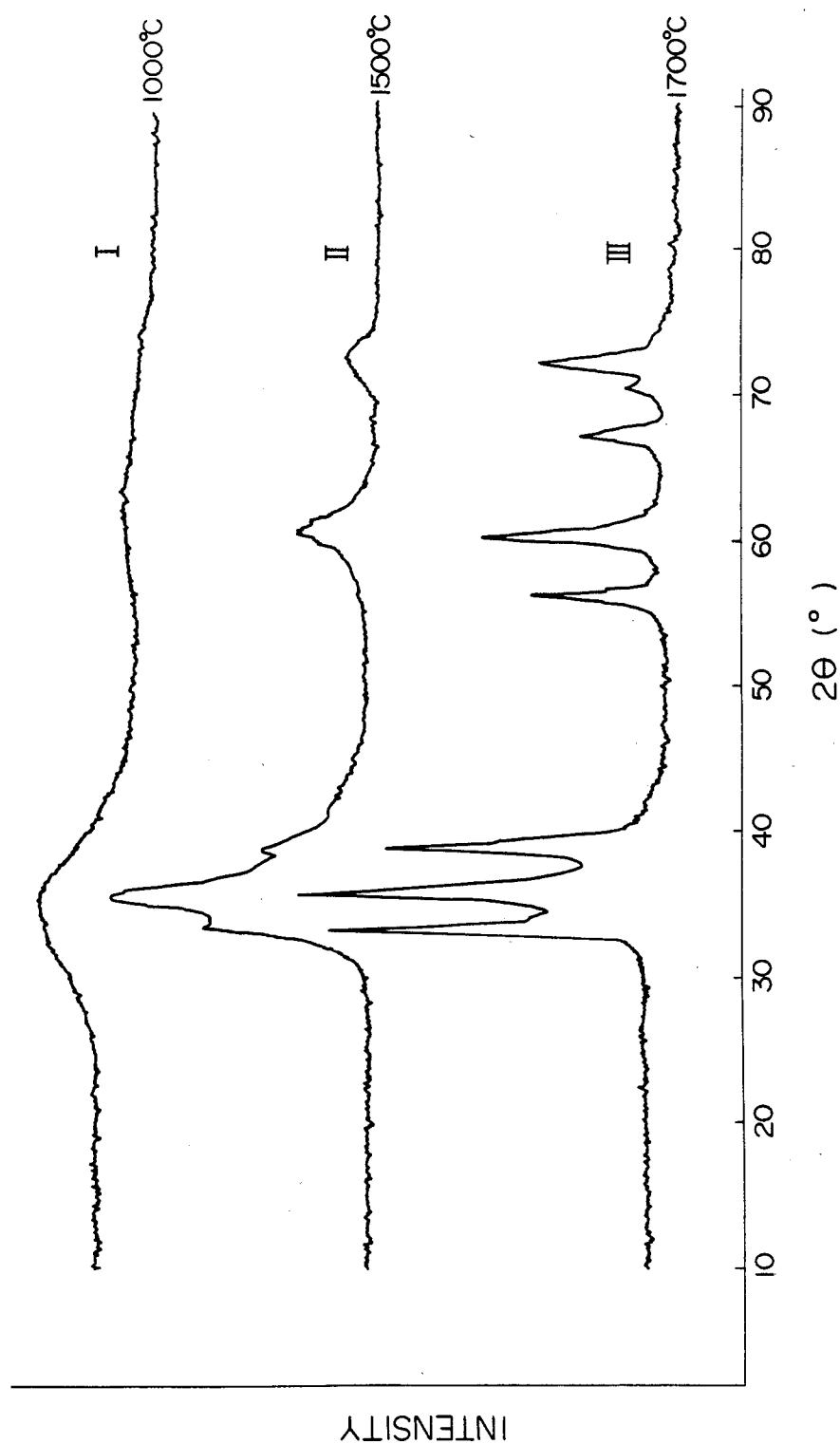

PROCESS FOR PRODUCTION OF SINTERED CERAMIC BODY

BACKGROUND OF THE INVENTION

This invention relates to a sintered body of a heat-resistant ceramic and a process for production thereof.

Silicon carbide-containing shaped articles were previously proposed, for example, in Japanese Laid-Open Patent Publications Nos. 94314/78, 3815/79 and 16521/79, and these patent documents disclose that the silicon carbide-containing shaped articles have good mechanical and thermal properties.

We have now discovered that a shaped article having better properties than a conventional silicon carbide-containing shaped article obtained by firing polycarbosilane can be obtained by firing a semi-inorganic block copolymer whose main-chain skeleton is composed of Si, Zr, C and O atoms.

SUMMARY OF THE INVENTION

The present invention provides a process for producing a sintered ceramic body, which comprises heating a semi-inorganic block copolymer at a temperature of 500° to 2300° C. in vacuum or in an atmosphere composed of at least one gas selected from the group consisting of inert gases, reducing gases and hydrocarbon gases, said copolymer comprising polycarbosilane blocks having a main-chain skeleton composed mainly of carbosilane units of the formula $\mathrm{-(Si-CH_2)-}$ each silicon atom of said carbosilane units having bonded thereto a side-chain group selected from the class consisting of hydrogen, lower alkyl and phenyl, and zirconoxane units of the formula $\mathrm{-(Zr-O)-}$; and shaping the heated product, and simultaneously with, or after, the shaping of the heated product, sintering the shaped product at a temperature of from 800° C. to 2,300° C. in vacuum or in an atmosphere composed of at least one gas selected from the group consisting of inert gases, reducing gases and hydrocarbon gases.

The present invention also provides a process for producing a sintered ceramic body, which comprises mixing the aforesaid semi-inorganic block copolymer with a ceramic composed of at least one material selected from the group consisting of oxides, carbides, nitrides, borides and silicides, shaping the resulting mixture, and simultaneously with, or after, the shaping of the mixture, sintering the shaped product at a temperature of from 800° C. to 2,300° C. in vacuum or in an atmosphere composed of at least one gas selected from the group consisting of inert gases, reducing gases and hydrocarbon gases.

The aforesaid ceramic may be a semi-inorganic heated product or inorganic heated product obtained by heating the aforesaid semi-inorganic block copolymer at a temperature of from 500° C. to 2,300° C. in vacuum or in an atmosphere of at least one gas selected from the group consisting of inert gases, reducing gases and hydrocarbon gases.

The present invention further provides a sintered ceramic body consisting substantially of Si, Zr and C and optionally of O, said sintered body being composed substantially of (1) an amorphous material consisting substantially of Si, Zr and C and optionally of O, or (2) an aggregate consisting substantially of ultrafine crystalline particles of $\beta$-SiC, ZrC, a solid solution of $\beta$-SiC and ZrC and $\mathrm{ZrC_{1-x}}$ wherein $0<x<1$ and having a particle diameter of not more than 500 Å, or (3) a mixture of said amorphous material (1) and said aggregate (2) of ultrafine crystalline particles.

BRIEF DESCRIPTION OF THE DRAWINGS

In the drawing, (I), (II) and (III) respectively show X-ray powder diffraction patterns of the sintered ceramic bodies obtained in Example 1(I), 1(II) and 1(III).

DETAILED DESCRIPTION OF THE INVENTION

The characteristic feature of the process of this invention consists in the production of a sintered ceramic body from a semi-inorganic block copolymer comprising polycarbosilane blocks having a main chain skeleton composed mainly of carbosilane units of the formula $\mathrm{-(Si-CH_2)-}$ each silicon atom of said carbosilane units having bonded thereto a side-chain group selected from the class consisting of hydrogen, lower alkyl and phenyl, and zirconoxane units of the formula $\mathrm{-(Zr-O)-}$ as a starting material.

The term "semi-inorganic polymer, as used herein, means that the main chain of the polymer comprises an inorganic structural unit such as $\mathrm{-(Si-C)-}$ or $\mathrm{-(Zr-O)-}$ and an organic radical is bonded as a side-chain group to the main chain.

The semi-inorganic block copolymer used as a starting material includes two types.

A first type is polyzirconocarbosilane having a number average molecular weight of 700 to 100000 which is obtained by mixing polycarbosilane with a number average molecular weight of 200 to 10000 mainly having a main chain skeleton expressed by the general formula

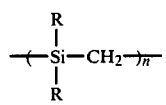

wherein R represents a hydrogen atom, a lower alkyl group or a phenyl group, with an organozirconium compound of the general formula

wherein X represents an alkoxy group having 1 to 20 carbom atoms, a phenoxy group or an acetylacetoxy group, in such proportions that the ratio of the total number of the structural units $\mathrm{-(Si-CH_2)-}$ of the polycarbosilane to that of the structural units $\mathrm{-(Zr-O)-}$ of the zirconium compound is in the range of from 2:1 to 200:1; and heating the resulting mixture in an atmosphere inert to the reaction, thereby to bond at least one of the silicon atoms of the polycarbosilane to the zirconium atoms of the zirconium compound through an oxygen atom.

The heating temperature is preferably not more than 500° C., and especially 100° to 350° C.

The polyzirconocarbosilane obtained as above is a semi-inorganic block copolymer having a number average molecular weight of 700 to 100,000 and comprising blocks of polycarbosilane and zirconoxane units of the formula $\mathrm{-(Zr-O)-}$, and at least one of the silicon atoms of the polycarbosilane blocks is bonded to the zirconium atom of the zirconoxane units through an oxygen atom. The ratio of the total number of the structural units $\{Si-CH_2\}$ to that of the structural units $\{Zr-O\}$ is in the range of from 2:1 to 200:1.

The above polyzirconocarbosilane as a first type of starting material and a process for its production are disclosed in detail in Japanese Patent Application No. 169443/79 filed by the present applicants.

A second type of the semi-inorganic block copolymer is an organometallic copolymer having a number average molecular weight of about 1000 to 50000 and comprising crosslinked polycarbosilane blocks and polyzirconosiloxane blocks, which is obtained by mixing (1) polycarbosilane with a number average molecular weight of about 500 to about 10000 having a main chain skeleton composed mainly of carbosilane units of the formula $\{Si-CH_2\}$, each silicon atom of the carbosilane units substantially having bonded thereto a side-chain group selected from the class consisting of hydrogen, lower alkyl and phenyl, with (2) polyzirconosiloxane with a number average molecular weight of about 500 to about 10000 having a main chain skeleton composed mainly of zirconoxane units of the formula $\{Zr-O\}$ and siloxane units of the formula $\{Si-O\}$, most of the zirconium atoms of said zirconoxane units having bonded thereto a side-chain group selected from the class consisting of lower alkoxy, phenoxy and acetylacetoxy, most of the silicon atoms of said siloxane units having bonded thereto a side-chain group selected from the class consisting of lower alkyl and phenyl, and the ratio of the total number of said zirconoxane units to that of said siloxane units being in the range of about 30:1 to about 1:30, in such mixing proportions that the ratio of the total number of said carbosilane units to the sum of the total number of said zirconoxane units and the total number of said siloxane units is in the range of about 100:1 to about 1:100; and heating the resulting mixture in an organic solvent (e.g., benzene, toluene, xylene, tetrahydrofuran, etc.) in an atmosphere inert to the reaction (e.g., nitrogen, argon, hydrogen, etc.) to bond at least one of the silicon atoms of said polycarbosilane with at least one of the zirconium atoms and/or silicon atoms of said polyzirconosiloxane through an oxygen atom.

The heating temperature is preferably not more than 500° C., especially 100° to 350° C.

The crosslinked organometallic block copolymer as the second type of starting material and a process for its production are disclosed in detail in our copending U.S. patent application Ser. No. 160,516 filed June 18, 1980, now U.S. Pat. No. 4,347,347.

The process of this invention for producing a sintered ceramic body from the first or second type semi-inorganic block copolymer as a starting material can be practised in various embodiments.

A first embodiment of the process of this invention is a process which comprises a first step of heating the semi-inorganic block copolymer at a temperature of from 500° to 2,300° C. in vacuum or in an atmosphere of at least one gas selected from inert gases, reducing gases and hydrocarbon gases, and a second step of shaping the heated product obtained in the first step and simultaneously with, or after, the shaping of the heated product, sintering the shaped product at a temperature of from 800° to 2,300° C. in vacuum or in an atmosphere composed of at least one gas selected from inert gases, reducing gases and hydrocarbon gases.

Examples of the inert gases used in the heating of the first step or the sintering of the second step are nitrogen gas, carbon dioxide gas, argon gas. Examples of the reducing gases are hydrogen gas and carbon monoxide gas. Examples of the hydrocarbon gases are methane gas, ethane gas, propane gas and butane gas.

The starting semi-inorganic block copolymer is rendered semi-inorganic or inorganic by the heating in the first step. When the heating temperature is 500° to 800° C., a semi-inorganic heated product is obtained mainly, and at a heating temperature of 900° to 2,300° C., an inorganic heated product is obtained mainly. There is no particular limitation on the form of the semi-inorganic heated product and the inorganic heated product so obtained. Usually, it is preferred to pulverize the heated products into granules or powders prior to the shaping step.

Broadly, the sintering in the second step can be performed by a method which comprises sintering the heated product after shaping it, or by a hot press method in which the shaping and sintering of the heated product are carried out simultaneously.

When the sintering is carried out after the shaping, the heated product is pressed at a pressure of 2 to 5,000 kg/cm² by a customary shaping method such as a mold press method, a rubber press method, an extrusion method or a sheet-forming method to produce a shaped article of a predetermined configuration. Subsequent sintering of the shaped article gives the sintered ceramic body of this invention.

When the sintering is carried out by the hot press method which performs shaping and sintering simultaneously, a press former made of a material such as graphite, alumina or boron nitride is used and the heated product is sintered simultaneously with its pressing under a pressure of 2 to 2000 kg/cm² by the press former, thereby producing the sintered ceramic body of the invention.

The sintering temperature is 800° to 2,300° C. If it is less than 800° C., the semi-inorganic block copolymer cannot be rendered completely inorganic, and at a temperature of more than 2,300° C., decomposition of SiC contained in the heated product takes place disadvantageously.

If desired, in the first embodiment of the process of this invention described above, the heated product of the semi-inorganic block copolymer may be heat-treated at a temperature of 600° to 1300° C. in an oxidizable gas atmosphere and/or treated with an acid-alkali before shaping and sintering it. Fluoric acid, sulfuric acid, hydrochloric acid, nitric acid, and aqua regia are cited as examples of the acid, and examples of the alkali are sodium hydroxide and potassium hydroxide. The oxidizing gas may, for example, be oxygen, air and other oxygen-containing gases. By performing this pretreatment, impurities such as traces of oxygen-containing compounds or a trace of excess carbon can be removed, and the density and strength of the resulting sintered body can be increased.

A second embodiment of the process of this invention is a process which comprises a first step of mixing the first or second type semi-inorganic block copolymer specified in this invention with a ceramic composed of at least one material selected from oxides, carbides, nitrides, borides and silicides, and a second step of shaping the mixture obtained in the first step, and simultaneously with, or after, the shaping of the mixture, sintering the shaped product at a temperature of 800° to 2,300° C. in vacuum or in an atmosphere composed of at least one gas selected from inert gases, reducing gases and hydrocarbon gases.

Attempts have previously been known to increase the sinterability of a ceramic substrate having poor self-interability by mixing it with additives in the production of a heat-resistant high-density sintered ceramic body.

Additives of this kind which have been used heretofore include, for example, MgO and NiO for $Al_2O_3$, CaO and $TiO_2$ for $ZrO_2$, $Al_2O_3$ and $Y_2O_3$ for $Si_3N_4$, B, Si and C for SiC, Ni and WC for TiC, and $ZrO_2$ and $CrB_2$ for $ZrB_2$. The enhanced sinterability of the ceramic is attributed to the fact that a solid phase reaction between the substrate ceramic and such an additive takes place so as to facilitate the sintering of the ceramic or that such an additive becomes plastic or liquid at high temperatures so that the sintering of the ceramic easily proceeds.

These conventional additives, however, have various defects as will be described below. In the production of a high-density sintered body by a solid-phase reaction between the additive and a ceramic substrate, second and third phases occur as a result of reaction between the additive and the ceramic and are present mainly in the crystal grain boundary. When the temperature becomes high, plastic deformation tends to take place in these phases which constitute the grain boundary, and in many cases, it is difficult to produce sintered bodies which have high strength at high temperatures. For example, when MgO is added to $Si_3N_4$, a vitreous phase of $SiMgO_3$ results as a second phase, and fills the grain boundary to make the product highly dense. However, the product has the defect that since the vitreous phase softens at high temperatures, the mechanical strength of the sintered body begins to decrease abruptly at about 1000° C. In the production of high-density sintered bodies by utilizing the plastication or liquefaction of additives, the strength of the product decreases markedly at high temperatures because of plastic deformation or liquid flow in the grain boundary.

The second embodiment of the invention process is characterized by using the semi-inorganic block copolymer specified in this invention as a new additive which densely fills the grain boundary and increases the sinterability of the ceramic substrate in the process of sintering, inhibits the growth of coarse particles of the ceramic, and which does not cause plastic deformation at high temperatures.

The semi-inorganic block copolymer specified in this invention is obtained as a viscous liquid or a powder. Since even the powder can be easily formed into a viscous liquid by heating it or by dissolving it in a solvent, it can be uniformly distributed throughout the substrate ceramic particles unlike conventional powdery additives. The semi-inorganic block copolymer forms highly active Si, Zr, C, O or volatile substances when heated at 800° to 2300° C. in vacuum or in an atmosphere of inert gases, reducing gases and hydrocarbon gases. The sinterability of the ceramic can be increased by the contact of these substances with the substrate ceramic. Furthermore, high-melting substances such as SiC, $ZrC_{1-x}$ (wherein $0<x<1$), ZrC, a solid solution of SiC and ZrC, $Si_3N_4$ (formed slightly when heated in $N_2$), and C formed from the highly active substances, Si, Zr, C and O, or various high-melting substances such as those formed by the reaction of the substrate ceramic with the highly active substances, Si, Zr, C and O are present mainly in the grain boundary to inhibit the abnormal growth of the ceramic particles.

Since the high melting substances filling the grain boundary also have very high mechanical strength at high temperatures, the strength at high temperatures of the sintered product as a whole is not reduced.

When heated, the semi-inorganic block copolymer used as an additive decomposes. Organic substances containing some carbons, hydrogens, oxygens, silicons and zilconium volatilize, and the remaining carbons, oxygens, silicons and/or zilconiums react with the substrate ceramic to form compounds which fill the interstices among the ceramic particles. This reaction begins at about 500° C., and ends at about 1500° C. During this time, the ceramic particles themselves are also sintered. In the process of sintering, the additive acts not only as a binder, but also as a sintering aid and a coarse grain growth inhibitor. Since the various compounds formed in the grain boundary of the ceramic in the heating step are usually composed of very fine particlers having a size of not more than 500 Å, the resulting sintered body has superior thermal shock resistance. Furthermore, because these compounds are mainly SiC, ZrC, a solid solution of SiC and ZrC, $ZrC_{1-x}$ wherein $0<x<1$, $Si_3N_4$ and C, etc., they have very good high-temperature mechanical strength, oxidation resistance, corrosion resistance and thermal shock resistance and chemical durability. These superior properties are reflected in the entire sintered body.

According to the second embodiment of the process of this invention, the additive is mixed usually in an amount of 0.05 to 20% by weight with a ceramic powder. As will be described hereinbelow, the amount of the additive varies depending upon the method of sintering under pressure. If the amount is less than 0.05% by weight, it is difficult to obtain sintered bodies having high strength. If it is added in an amount of more than 20% by weight, swelling partly occurs in the sintered body, and its strength decreases. It is usually advantageous therefore to limit the amount of the additive to the range of 0.05 to 20% by weight.

The ceramic to be mixed with the semi-inorganic block copolymer is, for example, an oxide such as $Al_2O_3$, BeO, MgO, $ZrO_2$ or $SiO_2$, a carbide such as SiC, TiC, WC or $B_4C$, a nitride such as $Si_3N_4$, BN or AlN, a boride such as $TiB_2$ or $ZrB_2$, a silicide such as $MoSi_2$, $WSi_2$ or $CrSi_2$, or a ternary or higher compound of these. There is no particular restriction on the shape of these heat-resistant ceramics. Usually, however, it is advantageous to use them in a powdered form.

The shaping and sintering in the second step of the second embodiment are substantially the same as those in the second step of the first embodiment described hereinabove.

If desired, in the second embodiment of the process of this invention, the mixture of the semi-inorganic block copolymer and the ceramic obtained in the first step may be pre-heated at a temperature of not more than 800° C. in vacuum or in an atmosphere composed of at least one gas selected from inert gases, reducing gases and hydrocarbon gases, prior to submitting it to the shaping and sintering in the second step. This pretreatment can lead to a sintered body having reduced volume shrinkage and a superior dimensional accuracy.

A third embodiment of the process of this invention is a variation of the second embodiment described hereinabove. It is a process which comprises using a semi-inorganic heated product or inorganic heated product obtained by heating the semi-inorganic block copolymer itself at a temperature of 500° to 2,300° C. in vacuum or in an atmosphere of at least one gas selected from inert gases, reducing gases and hydrocarbon gases (i.e., the heated product obtained in the first step of the first embodiment of the process of this invention) as the ceramic to be mixed with the semi-inorganic block copolymer in the first step of the second embodiment.

In the first, second or third embodiment of the process of this invention, the sintered ceramic body may, if desired, be subjected to a treatment which comprises impregnating it with the semi-inorganic block copolymer in the liquid state by dipping, spraying, coating, etc. (when the semi-inorganic block copolymer is obtained as a liquid, it is directly used in the impregnating step, and if it is obtained as a solid, it is heated, or dissolved in a solvent, to render it liquid before use in the impregnation step), optionally pressing the sintered body to enhance the degree of impregnation, and then heating it at a temperature of 800° to 2,300° C. in vacuum or in an atmosphere of at least one gas selected from inert gases, reducing gases and hydrocarbon gases. A sintered body having a higher density and higher strength can be obtained by performing at least once a series of the impregnating and heating treatments described above. When the semi-inorganic block copolymer is obtained as a liquid at room temperature or at relatively low heating temperatures, it can be used directly in the above process. If required, it may be dissolved in a small amount of a solvent capable of dissolving the semi-inorganic block copolymer, such as benzene, toluene, xylene, hexane, ether, tetrahydrofuran, dioxane, chloroform, methylene chloride, petroleum ether, petroleum benzin, ligroin, Furon, dimethyl sulfoxide, and dimethylformamide in order to reduce the viscosity of the polycarbosilane.

The first and third embodiments of the process of this invention are processes for producing a sintered ceramic body by using substantially only the semi-inorganic block copolymer as a starting material. The resulting sintered bodies (to be referred to as the sintered body of this invention) have a unique structure as described below.

The sintered body of this invention is composed substantially of Si, Zr and C or Si, Zr, C and O, and the structure of the sintered body varies as shown in (A) to (C) below depending upon the conditions for preparing the starting semi-inorganic block copolymer and the sintering temperature.

(A) When the sintering temperature is relatively low, sintered bodies consisting substantially of an amorphous material are obtained. Depending upon the conditions employed in the preparation of the sintered body, the amorphous material consists of Si, Zr and C, or Si, Zr, C and O. Generally, when conditions which do not cause substantial remaining of oxygen in the sintered body obtained by sintering are selected, an amorphous material composed mainly of Si, Zr and C results. Conversely, when conditions which cause easy remaining of oxygen in the sintered body after sintering are selected, an amorphous material composed mainly of Si, Zr, C and O results. Oxygen remains more readily in the sintered body as the amount of organozirconium compound used is increased relative to the amount of polycarbosilane (in the case of using the first starting material) or the amount of polyzirconosiloxane (in the case of the second starting material) is increased relative to the amount of polycarbosilane in the production of the starting semi-inorganic block copolymer. In contrast, by performing the sintering in vacuum, oxygen is more readily removed than in the case of performing it in a stream of an inert gas such as nitrogen or argon, and therefore, oxygen remains to a lesser extent in the sintered body. Furthermore, since oxygen is more easily removed by performing the sintering simultaneously with the shaping than by first shaping the heated product and then sintering it, oxygen does not remain in an appreciable amount in the sintered ceramic body. For example, in Example 1, (I) given hereinbelow, polyzirconocarbosilane in which the ratio of the total number of the $-(Si-CH_2)-$ units to that of the $-(Zr-O)-$ units is about 8:1 is heated at 1000° C. in a nitrogen stream. The heated product is mixed with the aforesaid polyzirconocarbosilane, and the mixture is shaped and sintered at 1000° C. in a nitrogen stream. The sintered body obtained at this time consists substantially of an amorphous material composed mainly of Si, Zr, C and O. On the other hand, in Example 3 given hereinbelow, polyzirconocarbosilane in which the ratio of the total number of $-(Si-CH_2)-$ units to that of $-(Zr-O)-$ units is about 23:1 is heated at 800° C. in a stream of a mixture of carbon monoxide and nitrogen. The heated product is pulverized, and the resulting powder is shaped and sintered at 1000° C. in an atmosphere of a mixture of carbon monoxide and nitrogen. The sintered body obtained at this time consists substantially of an amorphous material composed mainly of Si, Zr and C.

(B) When the sintering temperature is high, there are obtained sintered bodies consisting substantially of an aggregate of ultrafine crystalline particles of $\beta$-SiC, ZrC, a solid solution of $\beta$-SiC and ZrC, and $ZrC_{1-x}$ ($0<x<1$) having a particle size of not more than 500 Å. For example, the sintered body described in Example 1, (III) given hereinbelow is obtained by sintering the press-formed product obtained in Example 1, at a temperature of 1700° C. in a stream of nitrogen. The sintered bodies of Example 1, (III) consists of an aggregate of these ultrafine crystalline particles.

The reason for the formation of sintered bodies of the aforesaid structure at a high sintering temperature is described below. The semi-organic block copolymer used as a starting material can be made inorganic by the sintering. At a relatively low sintering temperature, the inorganic material formed is an amorphous material composed mainly of Si, Zr and C or Si, Zr, C and O, as stated in section (A) above, and no ultrafine crystalline particles have been produced. If the sintering temperature rises further, a part of the amorphous material is gradually converted to an aggregate of ultrafine crystalline particles of $\beta$-SiC, ZrC, a solid solution of $\beta$-SiC and ZrC, and $ZrC_{1-x}$ ($0<x<1$) having a particle size of not more than 500 Å. When the sintering temperature is sufficiently high, substantially all of the amorphous material is converted to the aggregate of ultrafine crystalline particles. When in the conversion to the aggregate of ultrafine crystalline particles, the amorphous material is composed mainly of Si, Zr, C and O, oxygen is gradually removed as the sintering temperature rises. When the sintering temperature becomes high enough, oxygen is removed almost completely, and does not remain in an appreciable amount in the final sintered body. Thus, finally the sintered body changes to the one consisting substantially of the aggregate of ultrafine crystalline particles in the same way as in the case in which the amorphous material is composed substantially of Si, Zr and C.

(C) When the sintering temperature is relatively high but does not cause complete conversion of an amorphous material to an aggregate of ultrafine crystalline particles, a sintered body composed of a mixture of the amorphous material described in (A) above and the aggregate of ultrafine crystalline particles described in (B) is obtained.

As described hereinabove, the sintered bodies of this invention embrace various embodiments, and assume structures shown in types (A-1) to (C-2) below.

Type (A-1): Sintered bodies consisting substantially of an amorphous material composed substantially of Si, Zr and C.

Type (A-2): Sintered bodies consisting substantially of an amorphous material composed substantially of Si, Zr, C and O.

Type (B): Sintered bodies consisting substantially of an aggregate of ultrafine crystalline particles of $\beta$-SiC, ZrC, a solid solution of $\beta$-SiC and ZrC, and $ZrC_{1-x}$ ($0<x<1$) having a particle size of not more than 500 Å.

Type (C-1): Sintered bodies consisting of a mixture of an amorphous material composed substantially of Si, Zr and C and an aggregate of ultrafine crystalline particles of $\beta$-SiC, ZrC, a solid solution of $\beta$-SiC and ZrC, and $ZrC_{1-x}$ ($0<x<1$) having a particle diameter of not more than 500 Å.

Type (C-2): Sintered bodies consisting of a mixture of an amorphous material composed substantially of Si, Zr, C and O and an aggregate of ultrafine crystalline particles of $\beta$-SiC, ZrC, a solid solution of $\beta$-SiC and ZrC, and $ZrC_{1-x}$ ($0<x<1$) having a particle diameter of not more than 500 Å.

In summary, when in the process for producing sintered ceramic bodies conditions are properly chosen to avoid substantial remaining of oxygen in the sintered bodies obtained by sintering, sintered bodies of the type (A-1) structure are obtained at a relatively low sintering temperature, sintered bodies of the type (B) structure are obtained at a sufficiently high sintering temperature, and sintered bodies of the type (C-1) structure are obtained at a sintering temperature intermediate of these. On the other hand, when such conditions are chose in the above process which permit easy remaining of oxygen in the sintered bodies obtained by sintering, sintered bodies of the type (A-2) structure are obtained at a relatively low sintering temperature, sintered bodies of the type (B) structure are obtained at a sufficiently high sintering temperature, and sintered bodies of the type (C-2) structure are obtained at a sintering temperature intermediate of these.

Surprisingly, the ceramic sintered bodies of this invention, even of the type (A-1) or type (A-2) structure composed mainly of an amorphous material and having a smaller bulk density exhibit very good strength and thermal properties. Generally, however, sintered bodies composed of an aggregate of ultrafine crystalline particles as in type and having a large bulk density exhibit the best strength and other properties.

It can be ascertained by X-ray diffraction patterns of sintered bodies that the ultrafine crystalline particles present in the sintered bodies of the type (B), (C-1) or (C-2) structure are composed of a composite carbide consisting of $\beta$-SiC, ZrC, a solid solution of $\beta$-SiC and ZrC and $ZrC_{1-x}$ ($0<x<1$). (III) in Figure is an X-ray diffraction pattern of the sintered bodies of this invention having the type (B) structure described in Examples (1-III) given hereinbelow. In the X-ray diffraction pattern of (III) shows a diffraction line (111) of $\beta$-SiC appearing at $2\theta=35.8°$, a diffraction line (220) of $\beta$-SiC at $2\theta=60.2°$, a diffraction line (311) of $\beta$-SiC at $2\theta=72.1°$, a diffraction line (111) of ZrC at $2\theta=33.7°$, a diffraction line (200) of ZrC at $2\theta=39.1°$, a diffraction line (220) of ZrC at $2\theta=56.3°$, a diffraction line (311) of ZrC at $2\theta=67.0°$ and a diffraction line (222) of ZrC at $2\theta=70.6°$. It is especially noteworthy that the diffraction lines of ZrC are shifted to a higher angle side than those of conventional ZrC, and the lattice constant of the ZrC differs from that of conventional ZrC.

The above X-ray diffraction data show that the ultrafine crystalline particles present in the sintered bodies consist mainly of $\beta$-SiC and ZrC and partly contain a solid solution of $\beta$-SiC and ZrC, and $ZrC_{1-x}$ ($0<x<1$).

The sintered bodies composed of ultrafine crystalline particles of such a unique composite carbide are novel sintered bodies quite unknown heretofore. In addition, that the ultrafine crystalline particles are composed of such a composite carbide brings about the advantage of giving very desirable superior properties to the sintered bodies of this invention. ZrC has much higher mechanical strengths, such as flexural strength, tensile strength and pressure resistance, than $\beta$-SiC, and $\beta$-SiC has the property of having a much higher decomposition temperature in an oxidizing atmosphere than ZrC. The sintered bodies of this invention have both ZrC and $\beta$-SiC, which are present in an intimate condition in the sintered bodies of this invention as is clear from the fact that both are partly dissolved to form a solid solution. Because of this, the desirable properties of ZrC and $\beta$-SiC are exhibited jointly in the resulting sintered bodies. Thus, the sintered bodies of this invention have better mechanical strength properties than conventional sintered bodies composed mainly of $\beta$-SiC, and show better oxidation resistance at high temperatures than the sintered bodies consisting mainly of ZrC.

The fine crystalline particles composed of the composite carbide which are present in the sintered bodies of this invention are ultrafine particles having an average particle diameter of not more than 500 Å. For example, it has been ascertained by X-ray diffraction than the ultrafine crystalline particles in the sintered bodies of the type (C-2) structure described in Example 1, (II) given hereinbelow (sintering temperature 1500° C.) have an average particle diameter of about 90 Å, and the ultrafine crystalline particles in the sintered bodies of the type (B) structure described in Example (1-III) described hereinbelow (sintering temperature 1700° C.) have a particle diameter of about 160 Å.

As the sintering temperature is increased, the crystalline particles in the resulting sintered bodies of this invention have an increased average particle diameter.

One of the reasons for the very high strength of the sintered bodies of this invention is presumably that they are composed of ultrafine crystalline particles. Since a localized concentration of stress disperses through the crystal grain boundary of high density, the sintered bodies have resistance to deformation. Because the crystals are in ultrafine particles, there is no room in the crystal grains for dislocation required for deformation. Since the crystal grain size is very small, the apparent surface tension of the particles is extraordinarily high, and the sintered bodies have high resistance to deformation. Furthermore, since the surface of the sintered bodies is smooth and free from depressions and raisings, a stress does not concentrate on the uneven portion and therefore, no decrease in strength occurs.

Chemical analysis of the sintered bodies of this invention shows that they generally contain 30 to 60% by weight of Si, 0.9 to 50% by weight of Zr, 19 to 40% by weight of C, and 0.01 to 20% by weight of O.

As is clear from the foregoing description, sintered bodies containing at most 20% by weight of oxygen can be obtained by selecting such manufacturing conditions as to permit easy remaining of oxygen in the sintered bodies obtained after sintering. Sintered bodies of the type (A-2) and (C-2) structures contain substantial amounts of oxygen. Even these sintered bodies are converted to sintered bodies of the type (B) which consists substantially of an aggregate of ultrafine crystalline particles when the sintering temperature is sufficiently high as shown in Example 1 given hereinbelow. X-ray diffraction analysis shows that oxygen atoms do not participate in the formation of the ultrafine crystalline particles.

The sintered body of this invention has a novel structure and possessing excellent mechanical strength, heat resistance and oxidation resistance, and can be used in the various applications exemplified below by utilizing these characteristics.

(1) Architectural and building materials: panels, domes, trailer houses, walls, ceilings, floors, cooling towers, purifying tanks, water sewerage tanks, water supply tanks, hot water supply pipes, water drainage pipes, heat pipes for heat exchange, etc.

(2) Aircraft materials and instruments and materials for aerospace exploitation: bodies, wings, drive shafts of helicopters, compressors of jet engines, rotors, stators, blades, compressor casings, housings, nose cones, rocket nozzles, braking material, tire cords, etc.

(3) Ship-building materials: boats, yachts, fishing boats, etc.

(4) Materials for road transporting vehicles: The front parts and side panels of motor vehicles, water tanks, lavatory units, seats, automobile bodies, containers, road machinery, guard rails, pallets, tanks for tank lorries, bicycles, autocycles, etc.

(5) Materials for anticorrosive machinery and instruments: tanks, tower ducts, stuffs, pipes, etc.

(6) Electrical materials: panel heaters, varistors, ignitors, thermocouples, etc.

(7) Sporting goods: boats, archery goods, skis, snow mobiles, water skis, glider bodies, tennis rackets, gold shafts, helmets, bats, racing jackets, etc.

(8) Machine elements: gaskets, packings, gears, braking materials, frictional materials, polishing and abrasive materials, etc.

(9) Materials for medical treatment: prosthetic legs and arms, etc.

(10) Acoustic instruments and materials: cantilevers, tone arms, speaker cones, voice coils, etc.

The following Examples further illustrate the present invention.

REFERENTIAL EXAMPLE 1

Anhydrous xylene (2.5 liters) and 400 g of sodium were put into a 5-liter three-necked flask, and heated to the boiling point of xylene in a stream of nitrogen gas. One liter of dimethyldichlorosilane was added dropwise over 1 hour. After the addition, the mixture was heated under reflux for 10 hours to form a precipitate. The precipitate was filtered, and washed with methanol and then with water to afford 420 g of polydimethylsilane as a white powder.

Separately, 759 g of diphenyldichlorosilane and 124 g of boric acid were heated at a temperature of 100° to 120° C. in n-butyl ether in an atmosphere of nitrogen gas. The resulting white resinous product was further heated at 400° C. in vacuum for 1 hour to give 530 g of polyborodiphenylsiloxane.

Then, 250 g of the polydimethylsilane obtained above was added to 8.27 g of the polyborodiphenylsiloxane obtained above. The mixture was heated to 350° C. in a stream of nitrogen in a 2-liter quartz tube equipped with a refluxing tube, and polymerized for 6 hours to afford polycarbosilane. The product was allowed to cool at room temperature, and xylene was added. The product was taken out as a solution in xylene. The xylene was evaporated, and the residue was concentrated at 320° C. for 1 hour in a stream of nitrogen to afford 140 g of a solid. The resulting polymer had a number average molecular weight, measured by a vapor pressure osmotic pressure method (VPO method), of 995. The IR spectrum of this substance showed an absorption of Si—CH$_3$ in the vicinity of 800 cm$^{-1}$ and at 1250 cm$^{-1}$, an absorption of C—H at 1400, 2900 and 2950 cm$^{-1}$, an absorption of Si—H at 2100 cm$^{-1}$ and an absorption of Si—CH$_2$—Si in the vicinity of 1020 cm$^{-1}$ and at 1355 cm$^{-1}$. The polymer obtained was polycarbosilane including the constituent elements of

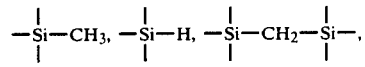

etc.

REFERENTIAL EXAMPLE 2

One hundred grams of tetramethylsilane was weighed, and reacted at 770° C. for 24 hours in an atmosphere of nitrogen using a flowing-type device capable of permitting recycling to obtain polycarbosilane. The product was allowed to cool at room temperature, and n-hexane was added. It was taken out as a solution in n-fhexane. The solution was filtered to remove the insoluble material, and then n-hexane was evaporated. The residue was concentrated at 180° C. for 1 hour under a reduced pressure of 5 mmHg to afford 14 g of a tacky substance. This polymer had a number average molecular weight, measured by the VPO method, of 450. The IR spectrum of this substance showed the various absorption peaks based on polycarbosilane as in Referential Example 1.

REFERENTIAL EXAMPLE 3

The polydimethylsilane (250 g) obtained in Referential Example 1 was put into an autoclave, and heat-polymerized in an argon atmosphere at 470° C. and about 100 atmospheres for 14 hours to obtain polycarbosilane. The product was allowed to cool at room temperature, and n-hexane was added. The product was thus taken out as a solution in n-hexane. The n-hexane was evaporated, and the residue was concentrated at 280° C. and 1 mmHg for 1 hour. The resulting solid was treated with acetone to remove low-weight-molecular materials and obtain 60 g of a polymer having a number average molecular weight of 8,750. The IR spectrum of this substance showed the various peaks based on the polycarbosilane same as in Referential Example 1.

EXAMPLE 1

Forty grams of the polycarbosilane obtained in Referential Example 1 and 31.5 g of zirconium tetrabutoxide were weighed, and 400 ml of xylene was added to the mixture to form a homogeneous mixed solution. The solution was subjected to refluxing reaction at 130° C. for 1 hour with stirring in an atmosphere of nitrogen gas. After the refluxing reaction, the temperature was raised further to 230° C., to distill off the xylene solvent. The residue was polymerized at 230° C. for 1 hour to afford polyzirconocarbosilane. The polymer had a number average molecular weight, measured by the VPO method, of 1,677. The ratio of the total number of the ${Si-CH_2}$-linkages of the polycarbosilane portion of this polymer to the total number of $-O-Zr(OC_4H_9)_3$ and ${Zr-O}$-linkages was about 8:1.

This polymer was heated to 1000° C. at a rate of 200° C./hr in an atmosphere of nitrogen, and the heated product was pulverized to a size smaller than 200 mesh. The resulting powder (90% by weight) and 10% by weight of the above polymer were mixed with a suitable amount of benzene. The mixture was dried, and crushed lightly in a mortar, and the particles were made uniform in size by using a 100-mesh sieve. The mixed powder was press-formed under a pressure of 1000 kg/cm$^2$ to afford a press-formed product having a size of 10 mm×50 mm×5 mm. The press-formed product was then sintered under the three different conditions shown in (I), (II) and (III) below.

(I) The press-formed product was sintered at a rate of 200° C./hr in a nitrogen atmosphere until the temperature rose to 1000° C. A sintered body containing Si, Zr and C and having a bulk density of 2.60 g/cm$^3$ and a flexural strength of 16.7 kg/mm$^2$ was obtained. An X-ray powder diffraction pattern of this sintered body is shown at (I) in the accompanying drawing. It is seen from (I) in the drawing that a broad (III) diffraction line ascribable to β-SiC is slightly noted, and other diffraction lines ascribable to β-SiC and diffraction lines ascribable to ZrC are scarcely noted. From this fact and the results of chemical analysis, the sintered body obtained under the sintering conditions of Example 1, (I) was found to have a structure of the type (A-2) described hereinabove.

(II) The press-formed product was sintered at a temperature raising rate of 200° C./hr in an atmosphere of nitrogen until the temperature reached 1500° C. A sintered body containing Si, Zr and C and having a bulk density of 2.75 g/cm$^3$ and a flexural strength of 21.2 kg/mm$^2$ was obtained. An X-ray powder diffraction pattern of the resulting sintered body in shown in (II) of the accompanying drawing. In (II) of the drawing, diffraction lines ascribable to β-Sic, although broad, are noted and a (III) diffraction line ascribable to ZrC at $2\theta=33.7°$ and a (200) diffraction line ascribable to ZrC at $2\theta=39.1°$ are slightly noted ($2\theta$ of each diffraction line of ZrC is shifted to a higher angle side). From this fact, and the results of chemical analysis, it was found that the sintered body obtained under the sintering conditions of Example 1, (II) had a structure of the type (C-2) described hereinabove. X-ray diffraction analysis showed that the ultrafine crystalline particles present in the sintered body had an average particle diameter of about 90 Å.

(III) The press-formed product was sintered at a temperature raising rate of 200° C./hr in an atmosphere of nitrogen until the temperature reached 1700° C. A sintered body containing Si, Zr and C and having a bulk density of 2.92 g/cm$^3$ and a flexural strength of 21.5 kg/mm$^2$ was obtained. An X-ray powder diffraction pattern of the resulting sintered body is shown in (III) of the accompanying drawing. In (III) of the drawing, sharp peaks of diffraction lines ascribable to β-SiC and ZrC are noted ($2\theta$ of each diffraction line of ZrC is shifted to a higher angle side). From this fact and the results of chemical analysis, the sintered body obtained under the sintering conditions in Example 1, (III) was found to have a structure of the type (B) described hereinabove. X-ray diffraction analysis showed that the ultrafine crystalline particles present in the sintered body had an average particle diameter of about 160 Å.

EXAMPLE 2

Polycarbosilane (40.0 g) having a number average molecular weight of 2,990 which was obtained by concentrating the polymer obtained in Referential Example 1 at 330° C. for 3 hours in a stream of nitrogen and 75.3 g of zirconium tetraisopropoxide were weighed, and 500 ml of benzene was added to the mixture to form a homogeneous mixed solution. The solution was subjected to refluxing reaction at 70° C. for 5 hours with stirring in an argon gas atmosphere. After the refluxing reaction, the reaction mixture was further heated to distill off benzene. The residue was polymerized at 150° C. for 2 hours to afford polyzirconocarbosilane having a number average molecular weight of 9,760. The resulting polymer was a uniform blackish blue resinous material. In the resinous material, the ratio of the total number of the ${Si-CH_2}$-linkages of the polycarbosilane portion to the total number of $-O-Zr-(O-isoC_3H_7)_3$ and ${Zr-O}$-linkages was about 3:1.

The resulting polymer was heated to 800° C. in vacuum (10$^{-3}$ mmHg) at a rate of 100° C./hr, and the heated product was pulverized to a size smaller than 200 mesh. The powder was set in a carbon die, and hot-pressed for 0.5 hour at 2000° C. in an argon stream by applying a pressure of 250 kg/cm$^2$ from the outset at room temperature. A sintered body having a bulk density of 3.60 g/cm$^3$ and a flexural strength of 42.0 kg/mm$^2$ was obtained. X-ray powder diffraction analysis and chemical analysis showed that the resulting sintered body had a structure of the type (B) described hereinabove.

EXAMPLE 3

Forty grams of the polycarbosilane obtained in Referential Example 2 and 14.3 g of tetrakisacetylacetonatozirconium were weighed, and 60 ml of ethanol and 300 ml of xylene were added to the mixture to form a homogeneous mixed solution. The solution was subjected to refluxing reaction at 60° C. for 8 hours in an atmosphere of nitrogen gas with stirring. After the refluxing reaction, the reaction mixture was further heated to distill off the ethanol and xylene, and then polymerized at 180° C. for 3 hours to afford polyziroconocarbosilane having a number average molecular weight of 1,380. In the resulting polymer, the ratio of the total number of the ${Si-CH_2}$-linkages of the polycarbosilane portion and the total number of the $-O-Zr(CH_3COCHCOCH_3)_3$ and ${Zr-O}$ linkages was about 23:1.

The resulting polymer was heated to 800° C. at a rate of 200° C./hr in an atmosphere of a mixture of CO and N$_2$ (CO:N$_2$=1:4 by mole). The heated product was pulverized to a size smaller than 200 mesh, and press-formed under a molding pressure of 2000 kg/cm$^2$ to afford a press-formed product having a size of 10 mm×50 mm×5 mm. The press-formed product was sintered at a temperature raising rate of 100° C./hr in an atmosphere of a mixture of carbon monoxide and nitrogen (in a CO:N$_2$ mole ratio of 1:4) until the temperature reached 1000° C. A sintered body containing Si, Zr and C and having a bulk density of 2.54 g/cm$^3$ and a flexural strength of 12.3 kg/mm$^2$ was obtained. X-ray powder diffraction analysis and chemical analysis show that the resulting sintered body had a structure of the type (A-1) described hereinabove.

EXAMPLE 4

The polycarbosilane obtained in Referential Example 3 (40.0 g) and 2.6 g of zirconium tetraphenoxide were weighed, and 200 ml of xylene was added to the mixture to form a homogeneous mixed solution. The solution was subjected to refluxing reaction at 130° C. for 2 hours in an argon gas atmosphere with stirring. After the refluxing reaction, the reaction mixture was further heated to distill off xylene, and polymerized at 300° C. for 30 minutes to afford polyzirconosilane having a number average molecular weight of 19,300. In the resulting polymer, the ratio of the total number of the $-(Si-CH_2)-$ linkages of the polycarbosilane portion to the total number of the $-O-Zr(O-C_6H_5)_3$ and (Zr—O) linkages was about 122:1.

The resulting polymer was heated to 1800° C. at a rate of 200° C./hr in an argon atmosphere. The heated product was further heated in the air to 700° C. at a rate of 300° C./hr to remove excess carbon, and then pulverized to a size smaller than 200 mesh. The resulting powder (80% by weight) and 20% by weight of the above polymer were mixed with a suitable amount of n-hexane. The mixture was dried and then pulverized. The mixed powder was press-formed under a molding pressure of 3000 kg/cm$^2$ to afford a press-formed product having a size of 10 mm×50 mm×5 mm. The press-formed product was sintered at a temperature raising rate of 100° C./hr in an argon atmosphere until the temperature reached 1,200° C. A sintered body containing Si, Zr and C and having a bulk density of 2.73 g/cm$^3$ and a flexural strength of 18.1 kg/mm$^2$ was obtained. X-ray powder diffraction analysis and chemical analysis showed that the resulting sintered body had a structure of the type (C-1) described hereinabove.

EXAMPLE 5

The polyzirconocarbosilane obtained in Example 2 was heated to 500° C. in a nitrogen atmosphere at a rate of 100° C./hr, and the heated product was pulverized to a size smaller than 200 mesh. The resulting powder (85% by weight) and 15% by weight of the above polymer were mixed with a suitable amount of xylene. The mixture was dried, and calcined in a nitrogen atmosphere at a temperature raising rate of 100° C./hr until the temperature reached 700° C. The calcined product was pulverized. Then, 90% by weight of the resulting powder and 10% by weight of the above polymer were further mixed with a suitable amount of xylene. The mixture was dried and the pulverized. The mixed powder was press-formed under a molding pressure of 2000 kg/cm$^3$ to obtain a press-formed product having a size of 10 mm×50 mm×5 mm. The press-formed product was sintered at a temperature raising rate of 200° C./hr in an atmosphere of nitrogen until the temperature reached 1400° C. A sintered body containing Si, Zr and C and having a bulk density of 2.99 g/cm$^3$ and a flexural strength of 31.0 kg/mm$^2$ was obtained. X-ray powder diffraction analysis and chemical analysis showed that the resulting sintered body had a structure of the type (C-2) described hereinabove (close to the structure of the type (B)).

EXAMPLE 6

The sintered boxy obtained in Example 1, (III) was dipped in a benzene solution of the polyzirconocarbosilane used in Example 1 in a concentration of 1 g/ml. The impregnated sintered body was dried, and sintered at a temperature raising rate of 200° C./hr in an atmosphere of nitrogen until the temperature reached 1800° C. This series of impregnation, drying and sintering was performed twice to afford a sintered body containing Si, Zr and C and having a bulk density of 3.15 g/cm$^3$ and a flexural strength of 36.8 kg/mm$^2$. X-ray powder diffraction analysis and chemical analysis showed that the resulting sintered body had a structure of the type (B) described hereinabove.

EXAMPLE 7

Ten percent by weight of the polyzirconocarbosilane having a number average molecular weight of 1.677 obtained in Example 1 and 90% by weight of an SiC powder having a size smaller than 200 mesh were mixed with a suitable amount of benzene. The mixture was dried and beaten lightly in a mortar. The particles were rendered uniform in size by using a 100-mesh sieve. The mixed powder was press-formed under a molding pressure of 1500 kg/cm$^2$ to afford a press-formed product having a size of 10 mm×50 mm×5 mm. The press-formed product was sintered at a temperature raising rate of 200° C./hr in a nitrogen gas atmosphere until the temperature reached 1200° C. An SiC sintered body having a bulk density of 2.68 g/cm$^3$ and a flexural strength of 14.0 kg/mm$^2$ was obtained.

EXAMPLE 8

Ten percent by weight of the polyzirconocarbosilane having a number average molecular weight of 9,760 obtained in Example 2 and 90% by weight of an Si$_3$N$_4$ powder were mixed with a suitable amount of n-hexane. The mixture was dried and then pre-heated to 600° C. at a rate of 100° C./hr in an argon atmosphere, and then pulverized. Then, 95% of the resulting powder and 5% by weight of the above polyzirconocarbosilane were mixed further with a suitable amount of n-hexane. The mixture was dried and then pulverized. The mixed powder was press-formed under a molding pressure of 2000 kg/cm$^2$ to afford a press-formed product having a size of 10 mm×50 mm×5 mm. The press-formed product was sintered at a temperature raising rate of 100° C./hr in an atmosphere of argon until the temperature reached 1400° C. An Si$_3$N$_4$ sintered body having a bulk density of 2.75 g/cm$^3$ and a flexural strength of 12.1 kg/mm$^2$ was obtained.

EXAMPLE 9

Seven percent by weight of the polyzirconocarbosilane having a number average molecular weight of 1,380 obtained in Example 3 and 93% by weight of α-Al$_2$O$_3$ having a size smaller than 200 mesh were mixed with a suitable amount of benzene. The mixture was dried, and pulverized. The mixed powder was press-formed under a molding pressure of 3000 kg/cm$^2$ to afford a press-formed product having a size of 10 mm×50 mm×5 mm. The press-formed product was sintered at a temperature raising rate of 200° C./hr in an atmosphere of nitrogen until the temperature reached 1000° C. An $Al_2O_3$ sintered body having a bulk density of 3.15 g/cm$^3$ and a flexural strength of 6.5 kg/mm$^2$ was obtained.

EXAMPLE 10

An SiC sintered body was obtained in the same way as in Example 7 except that instead of sintering the press-formed product at a rate of 200° C. in an atmosphere of nitrogen gas until the temperature reached 1200° C., the press-formed product was sintered at a temperature raising rate of 200° C./hr in an atmosphere of a mixture of carbon monoxide and nitrogen (in a Co:$N_2$ mole ratio of 1:4) until the temperature reached 1800° C. The resulting SiC sintered body was dipped in a benzene solution of the polyzirconocarbosilane used in Example 7 in a concentration of 1 g/ml, and the impregnated sintered body was dried, and sintered at a temperature raising rate of 200° C./hr in an atmosphere of a mixture of carbon nonoxide and nitrogen (in a Co:$N_2$ mole ratio of 1:4) until the temperature reached 1800° C. This series of impregnation, drying and sintering was performed twice to afford an SiC sintered body having a bulk density of 2.82 g/cm$^3$ and a flexural strength of 21.0 kg/mm$^2$.

EXAMPLE 11

Fifteen percent by weight of the polyzirconocarbosilane having a number average molecular weight of 19,300 obtained in Example 4 and 85% by weight of an SiC powder having a size smaller than 200 mesh were mixed with a suitable amount of tetrahydrofurane. The mixture was dried, pre-heated in an atmosphere of argon to 600° C. at a rate of 100° C./hr, and then pulverized.

The resulting powder was set in a carbon die, and hot-pressed in an argon atmosphere at 1800° C. for 0.5 hour. An SiC sintered body having a bulk density of 3.05 g/cm$^3$ and a flexural strength of 26.0 kg/mm$^2$ was obtained.

REFERENTIAL EXAMPLE 4

Diphenylsilanediol (864 g) and 383 g of zirconium tetrabutoxide were weighed, and xylene was added. The mixture was refluxed for 1 hour at 130° C. in an atmosphere of nitrogen. After the reaction, the insoluble matter was removed by filtration, and the xylene solvent was removed by an evaporator. The resulting intermediate was further polymerized at 270° C. for 30 minutes in an atmosphere of nitrogen to afford polyzirconosiloxane used as a starting material in this invention, in which the ratio of the total number of the zirconoxane units to that of the siloxane units was 1:4.

EXAMPLE 12

Forty grams of the polycarbosilane obtained in Referential Example 1 and 40 g of the polyzirconosiloxane obtained in Referential Example 4 were mixed, and 400 ml of xylene was added to form a homogeneous solution. The solution was refluxed at 130° C. for 3 hours with stirring in an atmosphere of nitrogen gas. After the refluxing reaction, the reaction mixture was further heated to 200° C. to distill off the xylene solvent, and then polymerized at 200° C. for 30 minutes to afford an organometallic copolymer.

Ten percent by weight of the resulting polymer and 90% by weight of an SiC powder having a size smaller than 200 mesh were mixed with a suitable amount of benzene. The mixture was dried and lightly beaten in a mortar, and the particles were made uniform in size using a 100-mesh sieve. The mixed powder was press-formed under a molding pressure of 1500 kg/cm$^2$ to afford a press-formed product having a size of 10 mm×50 mm×5 mm. The press-formed product was sintered at a temperature raising rate of 200° C./hr in an atmosphere of nitrogen gas until the temperature reached 1200° C. An SiC sintered body having a bulk density of 2.55 g/cm$^3$ and a flexural strength of 12.8 kg/mm$^2$ was obtained.

EXAMPLE 13

Diphenylsilanediol (600 g) and 675 g of tetrakisacetylacetonate zirconium were weighed, and xylene and ethanol (volume ratio; xylene:ethanol=4:1) were added, and after removing the solvents, the reaction was performed at 250° C. for 30 minutes. Otherwise, the same reaction as in Referential Example 4 was performed to afford polyzirconosiloxane in which the ratio of the total number of the zirconoxane linkages to that of the siloxane linkages was 1:2.

Ninety five grams of the resulting polymer and 40 g of the polycarbosilane obtained in Referential Example 1 were weighed, and 500 ml of xylene was added to the mixture to form a homogeneous mixed solution. The solution was subjected to a refluxing reaction with stirring in an atmosphere of nitrogen gas at 130° C. for 2 hours. After the refluxing reaction, the temperature was raised to 230° C. to distill off the xylene solvent. Then, the polymerization was performed at 230° C. for 2 hours to afford an organometallic copolymer.

Ten percent by weight of the resulting polymer and 90% by weight of an $Si_3N_4$ powder having a size smaller than 200 mesh were mixed with a suitable amount of n-hexane. The mixture was dried, preheated to 600° C. in an atmosphere of argon at a rate of 100° C./hr, and then pulverized. The resulting powder (95% by weight) and 5% by weight of the above polyzirconocarbosilane were mixed with a suitable amount of n-hexane. The mixture was dried, and pulverized. The mixed powder was press-formed under a molding pressure of 2000 kg/cm$^2$ to afford a press-formed product having a size of 10 mm×30 mm×5 mm. The press-formed product was sintered at a temperature raising rate of 100° C./hr in an atmosphere of argon until the temperature reached 1400° C. An $Si_3N_4$ sintered body having a bulk density of 2.60 g/cm$^3$ and a flexural strength of 11.0 kg/mm$^2$ was obtained.

EXAMPLE 14

Benzene (400 ml) was added to a mixture of 72 g of the polycarbosilane obtained in Referential Example 1 and 8 g of the polyzirconosiloxane obtained in Referential Example 4 to form a homogeneous solution. The solution was refluxed at 70° C. for 5 hours with stirring. After the refluxing reaction, the reaction mixture was further heated to 250° C. to distill off the benzene solvent, and then polymerized at 250° C. for 1 hour to afford an organometallic copolymer.

Seven percent by weight of the polymer and 93% by weight of α-$Al_2O_3$ having a size smaller than 200 mesh were mixed with a suitable amount of benzene. The mixture was dried, and pulverized. The mixed powder was press-formed under a molding pressure of 3000 kg/cm² to afford a press-formed product having a size of 10 mm×50 mm×5 mm. The press-formed product was sintered at a temperature raising rate of 200° C./hr in an atmosphere of nitrogen until the temperature reached 1000° C. An $Al_2O_3$ sintered body having a bulk density of 3.00 g/cm³ and a flexural strength of 6.5 kg/mm² was obtained.

EXAMPLE 15

An SiC sintered body was obtained in the same way as in Example 12 except that instead of sintering the press-formed product to 1200° C. at a rate of 200° C./hr in nitrogen gas, the press-formed product was sintered at a temperature raising rate of 200° C./hr in an atmosphere of a mixture of carbon monoxide and nitrogen (in a $CO:N_2$ mole ratio of 1:4) until the temperature reached 1800° C. The resulting sintered body was dipped in a benzene solution of the organometallic copolymer used in Example 12 in a concentration of 1 g/ml. The impregnated sintered body was dried, and then sintered at a temperature raising rate of 200° C./hr in an atmosphere of a mixture of carbon monoxide and nitrogen (in a $CO:N_2$ mole ratio of 1:4) until the temperature reached 1800° C. This series of impregnation, drying and sintering was performed twice to afford an SiC sintered body having a bulk density of 2.68 g/cm³ and a flexural strength of 19.5 kg/mm².

EXAMPLE 16

Fifteen percent by weight of the organometallic copolymer obtained in Example 13 and 85% by weight of an SiC powder having a size smaller than 200 mesh were mixed with a suitable amount of n-hexane. The mixture was dried, pre-heated to 600° C. at a rate of 100° C./hr in argon, and pulverized.

The powder was set in a carbon die, and hot-pressed in an argon stream at 1800° C. for 0.5 hour. An SiC sintered body having a bulk density of 2.97 g/cm³ and a flexural strength of 26.0 kg/mm² was obtained.

EXAMPLE 17

The organometallic copolymer obtained in Example 12 was heated to 800° C. in vacuum ($10^{-3}$ mmHg) at a rate of 100° C./hr. The heated product was pulverized to a size smaller than 200 mesh. The powder was set in a carbon die, and by applying a pressure of 250 kg/cm at the outset at room temperature, was hot pressed in an argon stream at 2000° C. for 0.5 hour. There was obtained a sintered body composed mainly of SiC, ZrC, a solid solution of SiC and ZrC and $ZrC_{1-x}$ ($0<x<1$) and having a bulk density of 3.09 g/cm³ and a flexural strength of 42.0 kg/mm².

What we claim is:

1. A process for producing a sintered ceramic body, which comprises heating a semi-inorganic block copolymer at a temperature of from 500° to 2300° C. in vacuum or in an atmosphere composed of at least one gas selected from the group consisting of inert gases, reducing gases and hydrocarbon gases, and shaping the heated product, and simultaneously with, or after, the shaping of the heated product, sintering the shaped product at a temperature of from 800° C. to 2300° C. in vacuum or in an atmosphere composed of a least one gas selected from the group consisting of inert gases, reducing gases and hydrocarbon gases, wherein said semi-inorganic block copolymer is an organometallic copolymer having a number average molecular weight of about 1000 to about 50000 and composed of cross-linked polycarbosilane blocks and polyzirconosiloxane blocks, which is obtained by mixing (1) polycarbosilane with a number average molecular weight of about 500 to about 10000 having a main chain skeleton composed mainly of carbosilane units of the formula $-(Si-CH_2)$, each silicon atom of the carbosilane units substantially having bonded thereto a side-chain group selected from the class consisting of hydrogen, lower alkyl and phenyl, with (2) polyzirconosiloxane with a number average molecular weight of about 500 to 10000 having a main chain skeleton composed mainly of zirconoxane units of the formula (Zr—O) and siloxane units of the formula (Si—O), most of the zirconium atoms of said zirconoxane units having bonded thereto a side-chain group selected from the class consisting of lower alkoxy, phenoxy and acetyl-acetoxy, most of the silicon atoms of said siloxane units having bonded thereto a side-chain group selected from the class consisting of lower alkyl and phenyl, and the ratio of the total number of said zirconoxane units to that of said siloxane units being in the range of about 30:1 to about 1:30, in such mixing proportions that the ratio of the total number of said carbosilane units to the sum of the total number of said zirconoxane units and the total number of said siloxane units is in the range of about 100:1 to about 1:100; and heating the resulting mixture in an organic solvent in an atmosphere inert to the reaction to bond at least one of the silicon atoms of said polycarbosilane with at least one of the zirconium atoms and/or silicon atoms of said polyzirconosiloxane through an oxygen atom.

2. The process of claim 1 wherein prior to the shaping of the heated product of the semi-inorganic block copolymer, it is heat-treated at a temperature of from 600° to 1300° C. in an oxidizing gas atmosphere and/or treated with an acid-alkali.

3. The process of claim 1 wherein sintered ceramic body obtained by the sintering is subjected at least once to a treatment comprising impregnating the sintered body with the semi-inorganic block copolymer and then heating the impregnated product at a temperature of 800° to 2300° C. in vacuum or in an atmosphere composed of at least one gas selected from the group consisting of inert gases, reducing gases and hydrocarbon gases.

4. A process for producing a sintered ceramic body, which comprises mixing the semi-inorganic block copolymer set forth in claim 1 with a ceramic composed of at least one material selected from the group consisting of oxides, carbides, nitrides, borides and silicides, shaping the mixture, and simultaneously with, or after, the shaping of the mixture, sintering the shaped product at a temperature of 800° to 2300° C. in vacuum or in an atmosphere composed of at least one gas selected from the group consisting of inert gases, reducing gases and hydrocarbon gases.

5. The process of claim 4 wherein prior to the shaping of the mixture, it is pre-heated at a temperature of not more than 800° C. in vacuum or in an atmosphere composed of at least one gas selected from the group consisting of inert gases, reducing gases and hydrocarbon gases.

6. The process of claim 4 wherein the sintered ceramic body obtained by the sintering is subjected at least once to a treatment comprising impregnating the sintered body with the semi-inorganic block copolymer and then heating the impregnated product at a temperature of 800° to 2300° C. in vacuum or in an atmosphere composed of at least one gas selected from the group consisting of inert gases, reducing gases and hydrocarbon gases.

7. A process for producing a sintered ceramic body, which comprises heating the semi-inorganic block copolymer set forth in claim 1 at a temperature of 500° to 2300° C. in vacuum or in an atmosphere composed of at least one gas selected from the group consisting of inert gases, reducing gases and hydrocarbon gases, mixing the heated product with the semi-inorganic copolymer, shaping the mixture, and simultaneously with, or after, the shaping of the mixture, sintering the shaped product at a temperature of 800° to 2300° C. in vacuum or in an atmosphere composed of at least one gas selected from the group consisting of inert gases, reducing gases and hydrocarbon gases.

8. The process of claim 7 wherein prior to the shaping of the mixture, it is pre-heated at a temperature of not more than 800° C. in vacuum or in an atmosphere of at least one gas selected from the group consisting of inert gases, reducing gases and hydrocarbon gases.

9. The process of claim 7 wherein the sintered ceramic body obtained by the sintering is subjected at least once to a treatment comprising impregnating the sintered body with the semi-inorganic block copolymer and then heating the impregnated product at a temperature of 800° to 2300° C. in vacuum or in an atmosphere composed of at least one gas selected from the group consisting of inert gases, reducing gases and hydrocarbon gases.

* * * * *